July 31, 1962   R. R. HOGSHIRE   3,046,971

GRILL SANDWICH WARMER

Filed July 20, 1959

INVENTOR
RICHARD R. HOGSHIRE
BY Herbert A. Minturn
ATTORNEY 3,046,971
GRILL SANDWICH WARMER
Richard R. Hogshire, 7551 Washington Blvd., Indianapolis, Ind.
Filed July 20, 1959, Ser. No. 828,122
1 Claim. (Cl. 126—33)

This invention relates to a sandwich warmer which may be positioned over the ordinary flat plate grill commonly employed in quick lunch stands or restaurants, particularly where sandwiches are preferably made in advance and are desired to be served warm. In order to serve customers quickly, as indicated, the sandwiches may be prepared in advance, and may be kept in a tasty, warmed condition without drying out or without becoming soggy, retaining the fresh flavor desired.

A primary object is to provide a simple, compact structure having a smooth upper warming surface which cannot become overheated. It is on this upper surface that the sandwiches are placed after being made up.

A further important object of the invention is to provide a "fool proof" construction which requires no automatic controls and which is always available and usable as long as there may be heat under the grill plate.

These and other objects and advantages of the invention will become apparent to those versed in the art in the following description of one particular form, which form is illustrated in the accompanying drawing.

Figure 1:
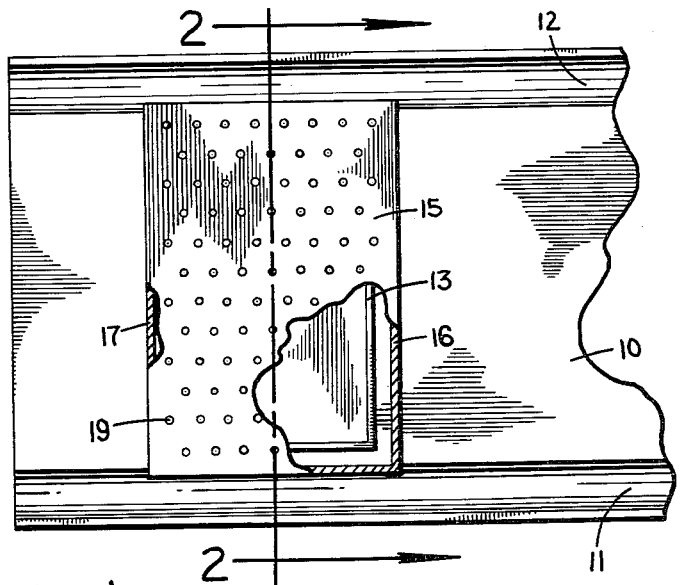
Figure 2:
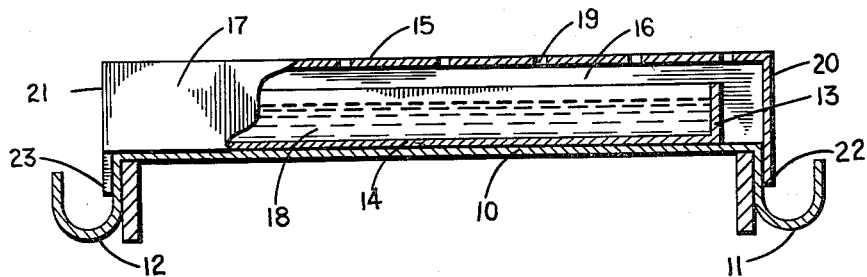

FIG. 1 of the drawing is a top plan view of a fragmentary portion of a grill to which the invention is applied, and appearing in partial section; and FIG. 2 is a view in vertical section on the line 2—2 in FIG. 1.

The invention is applied to the customary flat plate 10 employed for grilling food in the usual manner. The plate 10 is selectively heated in the usual manner either electrically or by gas burners not shown since they do not constitute a part of the invention per se. The primary consideration is that the plate 10 is heated.

Normally the grill plate 10 will have a front grease collecting gutter 11 below the level of the plate itself. In most instances, there will be a rear grease collecting gutter 12.

A water pan 13 is rectilinear in shape and has a flat bottom 14 bearing substantially uniformly over the topside of the plate 10. The pan 13 is relatively shallow, but sufficiently deep to carry at least an inch depth of water, although this depth is not critical and may be as much as two inches.

A sandwich carrying plate 15 is provided to have downwardly extended sides 16 and 17 which will normally bear on the topside of the grill plate 10 and extend entirely thereacross. The height of these side walls 16 and 17 spaces the sandwich plate 15 a distance above the pan 13 as indicated in FIG. 2 so that when the water 18 in the pan 13 is heated, vapor or steam arising therefrom may freely travel under the sandwich plate 15, over the pan 13, and between the side walls 16 and 17. The sandwich plate 15 is provided with a plurality of holes 19 therethrough to permit the escape of the water vapor or steam.

The sandwich plate 15 is held against shifting across the plate 10 between the gutters 11 and 12 by end walls 20 and 21 which are sufficiently high to have lower end portions 22 and 23 extend downwardly into the grease gutters 11 and 12 as indicated in FIG. 2. That is, the sandwich plate 15 is of that length together with its side walls 16 and 17 to permit the end plates 20 and 21 to extend vertically downwardly past the plane of the grill plate 10 to enter the gutters 11 and 12. By reason of these extensions 22 and 23, the sandwich plate 15 is held against travel across the grill 10. The end portions 22 and 23 slidingly engage along the upper, inner sides of the gutters 11 and 12 to effectively seal off any escape of steam downwardly therebetween. Also the side walls 16 and 17 bear by their under edges on the grill plate 10 so that any escape of steam or vapor is upwardly through the holes 19, without any induced draft being had.

In use, sandwiches are placed on the sandwich plate 15 to rest thereon, and when heated are ready to be served. The grill plate 10 is heated to only that degree under the pan 13 which will cause a small degree of emission of steam or water vapor without any degree of pressure of steam being developed under the sandwich plate 15, and that sandwich plate 15 is unifromly heated by the steam. The water 18 in the pan 13 may be replenished from time to time as it evaporates by simply lifting up the front end 20 to rock the sandwich plate 15 to permit access to the pan 13. It is to be noted that the sandwich plate 15 does not come into contact with the pan 13 so that the heat transmission from the grill is through the water causing it to vaporize to the point of steam, and the heating is done by this vaporization rather than by any conductivity directly from the grill 10. Therefore any accidental changing of the heating means to increase the temperature of the grill plate 10 does not cause burning of the sandwiches. The temperature of the steam does not increase appreciably even though the temperature of the plate may vary considerably. Thus a uniform warming of the sandwiches is had by this structure without any automatic control means.

While I have herein described and shown my invention in the one particular form, it is obvious that structural changes may be made without departing from the spirit of the invention, and I therefore do not desire to be limited to that precise form beyond the limitations which may be imposed by the following claim.

I claim:

The combination with a flat, imperforate rectangular cooking grill adapted to be heated from underneath and having a gutter along each of two opposite sides with a rectangular water pan having a flat bottom resting on the grill; a water pan cover plate over and above said pan; two opposite sides extending downwardly from opposite edge portions of said plate, extending across and bearing by edges of the sides on top of said grill, spacing the plate above the pan; and end walls extending downwardly into said gutters from ends of said plate and below the top of said grill along and engaging with side portions of the gutters; said sides and end walls of the cover plate forming an enclosure across said grill sealing off escape of steam generated from water in said pan laterally and downwardly of the grill; said plate being perforate as the sole means of steam escape; and said pan being spaced from direct heat conductivity from said plate.

References Cited in the file of this patent

UNITED STATES PATENTS

| | | |
|---|---|---|
| 470,546 | Cone | Mar. 8, 1892 |
| 715,945 | Beach | Dec. 16, 1902 |
| 1,158,727 | Sauvage | Nov. 2, 1915 |
| 2,867,712 | Schwaneke | Jan. 6, 1959 |
| 2,949,525 | Dunn | Aug. 16, 1960 |